May 30, 1933.  F. H. DRIGGS  1,911,943
RECOVERY OF RHENIUM
Filed Oct. 31, 1930
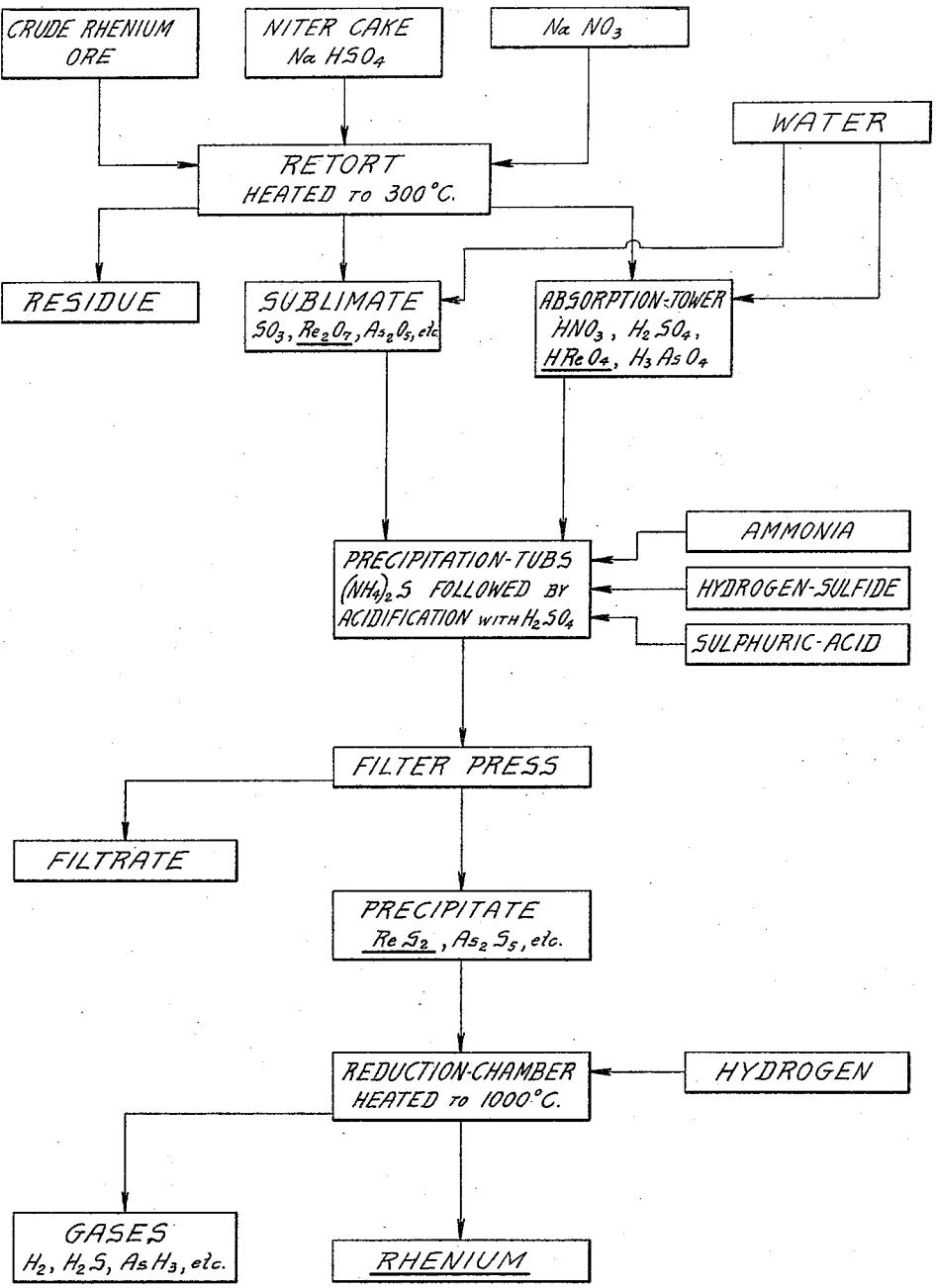
INVENTOR
F. H. DRIGGS
BY
ATTORNEY

UNITED STATES PATENT OFFICE

FRANK H. DRIGGS, OF BLOOMFIELD, NEW JERSEY, ASSIGNOR TO WESTINGHOUSE LAMP COMPANY, A CORPORATION OF PENNSYLVANIA

RECOVERY OF RHENIUM

Application filed October 31, 1930. Serial No. 492,397.

This invention relates to the art of metallurgy and more particularly to the art of recovering metals from ores and from raw materials containing the metals in combination with associated impurities. More particularly this invention relates to the recovery of the rare metal rhenium from its ores and crude concentrates.

One of the objects of the present invention is to provide a method for separating rhenium from its ores.

Another object of this invention is to provide a commercial process for the recovery of rhenium from ores and crude concentrates thereof.

Other objects and advantages will be apparent as the invention is more fully disclosed.

Rhenium usually occurs in ores, residues and the like in extremely small amounts, usually not exceeding approximately 5%. In such ores and crude concentrates the rhenium is to be found most generally in combination with strongly basic metal oxides as the rhennate or rhenite compounds which are thermally stable. It is known that the oxide compounds of rhenium are volatile at relatively low temperatures (between 100 and 150° C.), the degree of volatility increasing with the degree of oxidation of the rhenium. At approximately 300° C. the volatility of the higher oxide compound is marked.

The higher oxide ($Re_2O_7$) may be readily reduced to the lower oxides ($ReO_2$) and ($ReO_3$) by mild reducing agents such as, for example, CO or $SO_2$.

Crude ores containing rhenium must, therefore, be treated to effect the removal of carbon, sulphur, phosphorus and the like reducing agents and to effect substantial decomposition of the base metal-rhenium compounds before the rhenium may be separated therefrom as a volatile rhenium oxide compound ($Re_2O_7$).

The volatilized rhenium oxide may then be recovered and treated to effect the removal of associated impurities and subjected to a reducing action to convert the same to metal.

In accordance with the objects of the present invention I have devised a simple and efficient process whereby rhenium may be recovered from its crude ores and concentrates by directly volatilizing the same from the ore as the higher oxide compound which is recovered and reduced to metal. This process has been schematically outlined in the accompanying drawing setting forth the flow sheet of the process of the invention.

The crude ores, residue or concentrates containing the rhenium is first roasted under oxidizing conditions to effect the removal of carbonaceous material, sulphur, phosphorus and other easily oxidized materials. The rhenium by this step is converted ultimately into base metal rhennate compounds in accordance with the following reaction:

$$2\ ReS_2 + 7\tfrac{1}{2}O_2 \rightarrow Re_2O_7 + 4SO_2$$

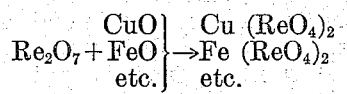

The oxidized ore or crude concentrates is then charged into a retort together with a strongly acid compound, such as sulphuric acid, phosphoric acids, sodium bisulphate ($NaHSO_4$), commercial nitercake or acid phosphate compounds and heated to temperatures approximating 300° C. in the presence of an oxidizing agent, such as sodium nitrate.

I preferably employ commercial nitercake or bisulphate compounds as these may be most expediently obtained on the market and more easily commercially applied. The amount of the nitercake or bisulphate employed will depend primarily upon the amount of and type of associated impurities in the ore or residues and the amount of rhenium therein. The objective is to convert the rhenium that is present in the ore or crude concentrates from the base metal rhennate compound to a volatile oxide compound in accordance to the following reaction:

$$NaHSO_4 + NaReO_4 \rightarrow Na_2SO_4 + Re_2O_7 + H_2O$$

With some type ores the fusion may be what is known in the art as a true fusion or it may be rather a dry fusion or roast, that is, an amount of the nitercake or bisulphate may be employed which is insufficient to bring the entire rhenium material to fusion.

In order to prevent the reduction of the $Re_2O_7$ compound to the lesser volatile lower oxides it is necessary that oxidizing conditions be maintained in the retort. I therefore, insure the presence of oxidizing conditions within the retort by the addition to the fusion mixture of discreet amounts of sodium nitrate ($NaNO_3$). If commercial nitercake is employed the addition of sodium nitrate to the retort will usually not be necessary.

At 300° C. rhenium oxide ($Re_2O_7$) is volatilized along with fumes of $SO_3$ and associated volatile acid impurities and may be collected in any suitable manner, as by condensation in a suitable chamber or by absorption in water, as has heretofore been employed in the arts.

The sublimed oxides and the solution from the absorption tower may then be combined and collected in aqueous solution in suitable sized precipitation vessels or tubs from which the rhenium is separated as the sulphide by precipitation with ammonia and hydrogen sulphide followed by acidification with sulphuric acid in a manner heretofore disclosed in the art.

The precipitated sulphides are then recovered from the solution in any convenient manner, as by filtering. If arsenic is present in the original ore the metal sulphides will be found to be contaminated therewith. The dried sulphide material may then be reduced to metal in any desired manner, as by heating to elevated temperatures in a hydrogen atmosphere.

It is preferable to employ the hydrogen reduction method on the sulphide material as arsenic and the like associated sulphide impurities are removed as volatile products. Other methods of reduction may be employed, however, if desired, such as the calcium reduction method of U. S. Patent No. 1,704,257 issued March 5, 1929 to J. W. Marden et al., or the electrolytic deposition method of copending application Serial No. 309,682, filed October 1, 1928 by F. H. Driggs et al., which patent and application is assigned to the same assignee as the present invention.

The rhenium metal powder thus prepared is then converted to coherent form by agglomerating to any desired shape or form and heat treating to elevated temperatures in vacua or in a reducing atmosphere to effect a coalescence of the metal powder particles to a coherent mass.

Care should be taken that the metal powder be thoroughly degasified prior to the final sintering thereof. If desired the metal powder product may be admixed with any suitable organic binder and shaped or molded as by commonly practiced extrusion methods to rod, filament and the like articles for use in the arts. These articles may then be sintered in any convenient manner to coherent bodies.

It will be apparent from the above disclosure that there may be many modifications and departures made in the specific embodiment disclosed herein but such modifications and departures are anticipated as may fall within the scope of the following claims.

What is claimed is:

1. The method of treating rhenium bearing material to recover the rhenium content thereof which comprises subjecting the material to the action of a strongly acid material which is substantially non-volatile at temperatures below approximately 150° C. in the presence of an oxidizing agent.

2. The method of treating rhenium bearing material to recover the rhenium content thereof which comprises subjecting the material to the action of a strongly acid material which is substantially non-volatile at temperatures below approximately 150° C. in the presence of an oxidizing agent capable of retaining the rhenium in the hexavalent state.

3. The method of treating rhenium bearing materials which comprises admixing the material with sodium acid sulphate and a proportion of an oxidizing agent and heating to temperatures approximately 300° C.

4. The method of treating rhenium bearing material which comprises admixing the material with sodium sulphate and a proportion of sodium nitrate and heating to temperatures approximately 300° C.

5. The method of recovering rhenium from ores and crude concentrates containing the same which comprises heating the rhenium containing material under oxidizing conditions to elevated temperatures approximating 300° C. with a proportion of a strongly acid fusion agent.

6. The method of recovering rhenium from ores and crude concentrates containing the same which comprises heating the rhenium containing material admixed with a proportion of commercial nitercake to elevated temperature approximating 300° C.

7. The method of recovering rhenium from ores and crude concentrates which comprises heating the rhenium containing material with sodium acid sulphate and an oxidizing agent to temperatures approximating 300° C. and collecting the volatilized rhenium oxide in any suitable manner.

8. The method of recovering rhenium from ores and crude concentrates which comprises heating the rhenium containing material with nitercake to temperatures approximating 300° C. and collecting the volatilized rhenium oxide in any suitable manner.

9. The method of recovering rhenium from ores and crude concentrates which comprises subjecting the rhenium containing material to a low temperature oxidizing step, admixing the oxidized material with a strongly acid material which is substantially non-volatile at temperatures below approximately 150° C. and heating the admixture to elevated temperatures approximating 300° C. under oxidizing conditions to effect a volatilization of the rhenium content as an oxide, and recovering the oxide in any suitable manner.

10. The method of recovering rhenium from ores and crude concentrates which comprises subjecting the rhenium containing material to a low temperature oxidizing step, admixing the oxidized material with sodium acid sulphate, and heating the admixture to elevated temperatures approximating 300° C. under oxidizing conditions to effect a volatilization of the rhenium content as an oxide and recovering the oxide in any suitable manner.

11. The method of recovering rhenium from ores and crude concentrates which comprises subjecting the rhenium containing material to a low temperature oxidizing step, admixing the oxidized material with nitercake and heating the admixture to elevated temperatures approximating 300° C. to effect a volatilization of the rhenium content as an oxide, and recovering the oxide in any suitable manner.

12. The method of treating rhenium bearing material containing perrhenates which comprises, treating the material at an elevated temperature in the presence of an oxidizing agent and a strongly acid material.

In testimony whereof, I have hereunto subscribed my name this 29th day of October, 1930.

FRANK H. DRIGGS.